(12) United States Patent
Kalmbach (10) Patent No.: US 6,731,093 B1
(45) Date of Patent: May 4, 2004

(54) 2-STEP BI-DIRECTIONAL STEPPING MOTOR

(75) Inventor: Ulrich Kalmbach, Pforzheim (DE)

(73) Assignee: Timex Group B.V. (NL)

( * ) Notice: Subject to any disclaimer, the term of this patent is extended or adjusted under 35 U.S.C. 154(b) by 70 days.

(21) Appl. No.: 10/090,588

(22) Filed: Feb. 28, 2002

(51) Int. Cl.$^7$ .............................................. H02K 37/12
(52) U.S. Cl. ...................... 318/696; 368/160; 310/49 R
(58) Field of Search ................................ 318/254, 685, 318/696, 701; 310/49 R; 368/155, 156, 157, 160

(56) References Cited

U.S. PATENT DOCUMENTS

| | | | |
|---|---|---|---|
| 3,005,941 A | | 10/1961 | Heggen |
| 3,370,189 A | | 2/1968 | Haydon et al. |
| 4,262,353 A | | 4/1981 | Okazaki et al. |
| 4,361,772 A | | 11/1982 | Fukushima |
| 4,361,790 A | | 11/1982 | Laesser et al. |
| 4,371,821 A | * | 2/1983 | Laesser et al. ............... 318/696 |
| 4,398,107 A | | 8/1983 | Fukushima |
| 4,514,676 A | * | 4/1985 | Grandjean et al. .......... 368/157 |
| 4,684,262 A | * | 8/1987 | Meister ....................... 318/696 |
| 4,855,629 A | | 8/1989 | Sato |
| 5,028,857 A | * | 7/1991 | Taghezout ................... 318/696 |
| 6,246,205 B1 | | 6/2001 | Kujira et al. |

FOREIGN PATENT DOCUMENTS

| | | |
|---|---|---|
| DE | 3627791 A | 2/1988 |
| EP | 0 640 895 B1 | 8/1994 |
| EP | 0 696 836 B1 | 2/1996 |
| EP | 0 790 540 B1 | 8/1997 |
| FR | 79 21461 | 8/1979 |
| GB | 2 054 978 A | 2/1981 |
| JP | 57156662 | 9/1982 |

OTHER PUBLICATIONS

Publication—6$^{th}$ CEC—Biel/Bienne, Oct. 17–18, 1996—"Bidirektionaler Schrittmotor des Typs Lavet".
Patent Abstracts of Japan, vol. 006, No. 259, Dec. 17, 1982, Publication No. 57156662.

* cited by examiner

Primary Examiner—Bentsu Ro
(74) Attorney, Agent, or Firm—Carmody & Torrance LLP (57) ABSTRACT

A bi-directional stepping motor in which a rotor is rotatable in steps of 180 degrees each, the stepping motor comprising a rotor comprising a permanent magnet and rotatably mounted about an axis and providing a permanent magnetic field; a first electrical coil and a second electrical coil; a stator on which the first electrical coil is mounted; and a control circuit, coupled to the first and second electrical coils, for applying electrical pulses independently to each coil and for controlling the polarity thereof, the coils producing magnetic fields in response to the pulses and wherein the rotor is rotatable in response to the magnetic fields; wherein each step of 180 degrees is effectuated by providing to the first coil, a first pulse of a first polarity and a second pulse of a second polarity; and to said second coil, a pulse of the second polarity simultaneously with the providing of the second pulse to the first coil; wherein during the providing of the first pulse to the first coil, there is no pulse being provided to the second coil.

8 Claims, 8 Drawing Sheets

⇧ direction of magnetic field (arrow tip: north pole)

Counter-Clockwise Rotation

Counter-Clockwise Rotation

FIG. 4d

⇧ direction of magnetic field (arrow tip: north pole)

2-STEP BI-DIRECTIONAL STEPPING MOTOR

The present invention is directed to stepping motors, and in particular, to an improved 2-step bi-directional stepping motor that is can reliably run in either direction merely dependent upon a specific pulse-current scheme used therewith. The present invention, among other applications, is particularly suited for use in connection with electronic quartz wristwatches or other micro-mechanical devices.

"Multi-Step" stepping motors, having multiple stator and/or rotor poles, or those of the so-called "Lavet" type, are well known in the art. For example, while the "multiple-step" motors run in both directions depending on the direction of the "rotor-driving" electromagnetic field, the "Lavet" type motor may have one preferred rotational direction achievable through the rotor's "rest position." The prior art provides a plurality of examples illustrating the foregoing constructions.

Figure 6:
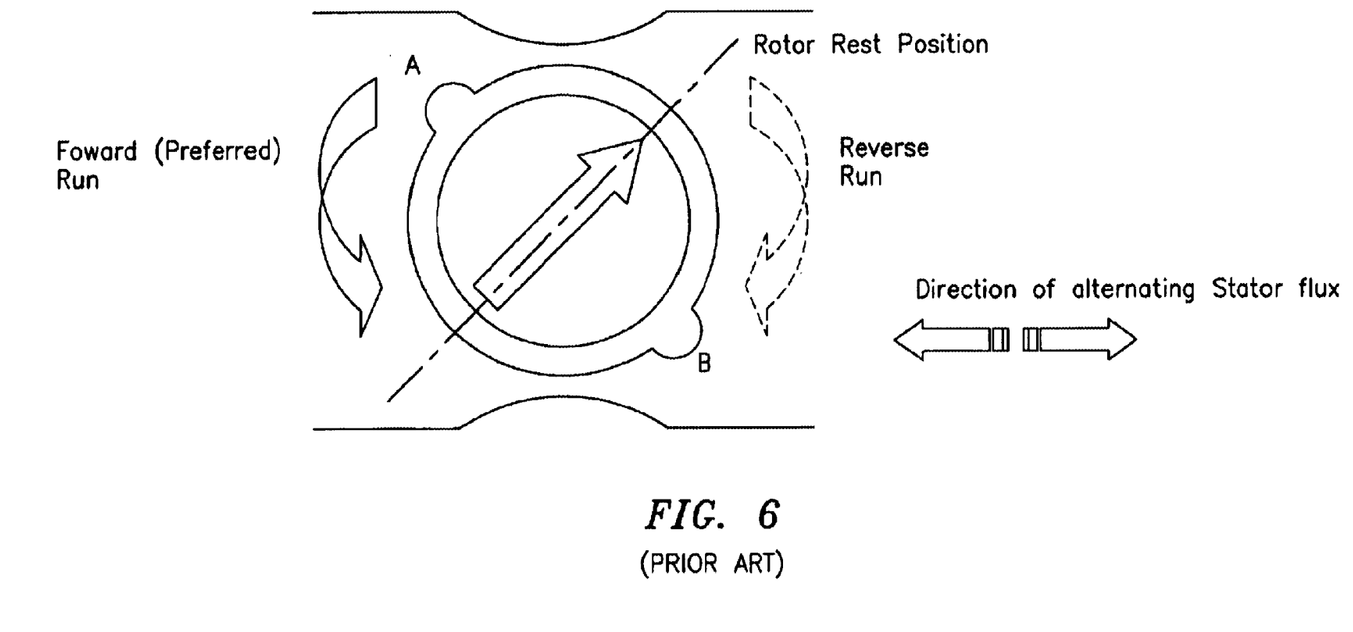
FIG. 6 is a portion of a stepping motor constructed in accordance with the prior art.

Alternating rectangular pulse-current schemes to drive rotors in 180 degree steps are also known. For example, in one such known configuration, an alternating rectangular current-pulse is applied to the motor coil, and the rotor magnet follows the changed magnetic flux in the stator, being pushed from its rest position to its opposite stable rest position, 180 degrees rotated. To continue the rotation of the rotor, the current-pulse is reversed and the rotor is pushed in the same rotational direction back to its starting-position, thus completing one revolution in two steps. FIG. 6 exemplifies the relevant portion of a prior art stepping motor that is operable in the foregoing manner. As can be readily seen, typical of such a stepping motor is the specific positioning of the "rest position," which may be chosen as a function of the magnetic vector of the electromagnetic flux generated by the motor coil. Geometries of the rotor or stator cutouts and/or the use of small permanent magnets can also play a significant part in the operation of such a stepping motor.

The foregoing exemplary stepping motor is widely used in electronic timepieces, notwithstanding its perceived deficiency in being unable to run in both a clockwise and counter-clockwise direction. Being able to run in both directions would be significantly advantageous, for example, so as to be able to perform a quick "time-setting" function in radio controlled watches.

Bipolar current-pulse sequences have been developed to make the foregoing type of stepping motor run in a reverse direction. For example, the rotor may be accelerated for a short distance (i.e. 45 degrees) from its rest position in the reverse direction by a first initial pulse so that when it passes its stator flux axis, a reversed pulse pushes it to the opposite stable position. Thereafter, it may again drop 45 degrees backwards, against the rotational direction, into its opposite stable Rest Position when the coil current is off. Unfortunately however, this particular stepping motor design provides for rough running, and additionally, due to the additionally required pulse per step, leads to higher power consumption while running in reverse. Furthermore, if the reverse pulse is not accurately applied in intensity and time, the rotor may undesirably pass its alternating rest positions thus leading to an undesirable "one step per revolution" result.

It can thus be seen that it is difficult to ensure a reliable 2-Step reverse run in known "Lavet" type stepping motors. However, the prior art is not without its attempts to do so.

For example, U.S. Pat. No. 4,361,790 attempts to overcome the foregoing deficiencies by the implementation of alternating the current direction within two respective coils. In particular, the two coils always operate simultaneously by a certain current-pulse scheme, which alleges, among other things, the elimination of the need to double the coil volume. U.S. Pat. No. 4,361,790 proposes a current-pulse scheme in which four steps per revolution, each of which is 90 degrees, are made. Such is the case in both the clockwise and counter-clockwise direction.

However, the present inventors still believe further improvements over the state of the art are necessary, both to overcome the foregoing explicitly perceived deficiencies as well as to overcome deficiencies that would be apparent to those skilled in the art. For example, one desirous feature is to construct a smooth running "Lavet" type stepping motor that can make two steps per revolution, in both the clockwise or counter-clockwise direction. Secondly, it is desirous to provide such a stepping motor that does not have a preferred rotational direction. In particular, it is desired that the shape of the current-pulses, applied to the motor coils, determine the direction of rotation of the rotor. The present invention achieves the foregoing and below mentioned objectives, as well as overcomes the perceived deficiencies in the prior art.

SUMMARY AND OBJECTS OF THE INVENTION

It is therefore an object of the present invention to provide an improved stepping motor that overcomes the foregoing perceived deficiencies.

It is another object of the present invention to provide an improved stepping motor that more smoothly runs in both the forward and reverse direction.

It is yet another object of the present invention to provide an improved stepping motor that does not increase the power consumption from that seen in prior art bi-directional stepping motors, namely, it is an object of the present invention to provide an improved current-pulse scheme that has the same power consumption regardless of the rotational direction of the rotor.

It is yet another object of the present invention to provide an improved stepping motor that merely needs to rely on the pulse-current scheme for its directional rotation.

Still other objects and advantages of the invention will in part be obvious and will in part be apparent from the specification.

The invention accordingly comprises the features of construction, combination of elements and arrangement of parts and sequence of steps which will be exemplified in the construction, illustration and description hereinafter set forth, and the scope of the invention will be indicated in the claims.

Generally speaking, in accordance with the present invention, a stepping motor in which a rotor is rotatable in steps of 180 degrees each, is provided. In one embodiment, the stepping motor comprises a rotor comprising a permanent magnet and rotatably mounted about an axis and providing a permanent magnetic field; a first electrical coil and a second electrical coil; a stator comprising three pole faces arranged around the rotor and arms on which the electrical coils are mounted; and a control circuit, coupled to the first and second electrical coils, for applying electrical pulses independently to each coil and for controlling the polarity thereof, the coils producing magnetic fields in response to the pulses and wherein the rotor is rotatable in response to the magnetic fields; wherein each step of 180 degrees is effectuated by providing to the first coil, a first pulse of a first polarity and a second pulse of a second polarity; and to said second coil, a pulse of the second polarity simultaneously with the providing of the second pulse to the first coil; wherein during the providing of the first pulse to the first coil, there is no pulse being provided to the second coil.

Furthermore, the rotation of the second 180 degree step is preferably achieved by providing to the first coil, a third pulse of the second polarity and a fourth pulse of the first polarity; and to said second coil, a pulse of the first polarity simultaneously with the providing of the fourth pulse to the first coil; wherein during the providing the third pulse to the first coil, there is no pulse being provided to the second coil.

In a particular arrangement, each step of 180 degrees is effectuated by a rotation of the rotor a first X degrees and then by a further rotation of the rotor the remaining 180-X degrees, wherein X is a predetermined number greater than zero. In a specific configuration, the value of X is approximately 30 degrees and the three pole faces are arranged at an angular spacing of approximately 120 degrees with respect to each other. In this manner, the rotation of the rotor the approximately X degrees is achieved by providing to the first coil, a first pulse of a first polarity; and wherein the rotation of the rotor the approximately 180-X degrees to complete a step is achieved by providing to the first coil a second pulse of a second polarity simultaneously with the providing of a pulse of the second polarity to the second coil. The second step of 180 degrees is effectuated by the additional rotation of the rotor X degrees and then by a further rotation of the rotor the remaining 180-X degrees; wherein the additional rotation of the rotor X degrees is achieved by providing to the first coil, a third pulse of the second polarity; and wherein the rotation of the rotor the approximately 180-X degrees to complete the second step is achieved by providing to the first coil a fourth pulse of the first polarity simultaneously with the providing of a pulse of the first polarity to the second coil; whereby during the providing of the third pulse to the first coil, there is no pulse being provided to the second coil.

In a preferred embodiment, the stepping motor constructed in accordance with the present invention is incorporated into a timepiece, such as a wristwatch.

BRIEF DESCRIPTION OF THE DRAWINGS

For a fuller understanding of the invention, reference is had to the following description taken in connection with the accompanying figures, in which.

DETAILED DESCRIPTION OF THE PREFERRED EMBODIMENTS

Figure 1:
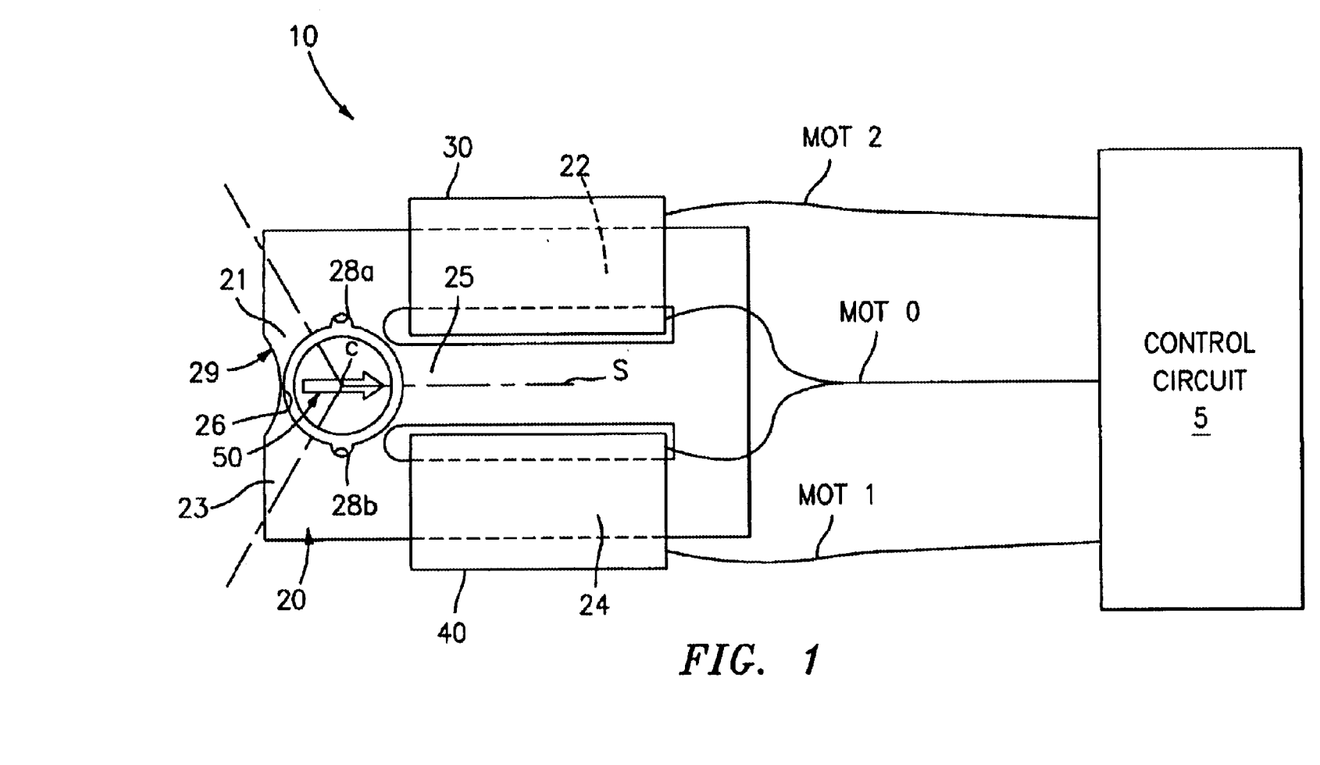
FIG. 1 is an illustration of a stepping motor constructed in accordance with the present invention.

Reference is first made to FIG. 1 wherein a bi-directional stepping motor, generally illustrated at 10, constructed and arranged in accordance with the present invention, is disclosed. In a preferred embodiment, motor 10 comprises a stator, generally indicated at 20, made of a soft magnetic (i.e. iron) material and generally in the shape of the depicted rectangle, although one skilled in the art would appreciate that this rectangular shape is by way of example, and not limitation. As particularly depicted, stator 20 includes a first arm 22 and a second arm 24 around which a respective first coil 30 and second coil 40 are disposed.

A rotor 50, comprised of a permanent magnet having diametrically opposed North (N) and South (S) poles (the arrow in the center of rotor 50 points to the N pole thereof), is positioned in an opening 26 of stator 20. Opening 26 preferably comprises two opposing notches 28a, 28b that define a static equilibrium axis for rotor 50. Stator 20 also comprises a notch 29 for assisting in creating the field directions caused by the created magnetic fluxes, as further disclosed below.

Stator 20 is configured to provide three pole faces 21, 23, 25, all of which are positioned, at approximately 120 degrees with respect to each other, about a center C being approximately the center of rotor 50. Importantly, the angular zones occupied by pole faces 21, 23 are approximately equal. Stator 20 has, as illustrated in FIG. 1, an axis of symmetry (S) passing through the middle of pole face 25, through the middle of rotor 50 and through the middle of notch 29.

A specific current-pulse timing circuit has been constructed and arranged to enable motor 10 to run in both the clockwise ("CW") and counter-clockwise ("CCW") directions. Advantageously, the present invention provides for the same power consumption, regardless of the rotational direction of rotor 50.

A control circuit 5, also illustrated in FIG. 1 energizes coils 30 and 40 with the aforementioned current-pulse scheme by way of current-pulses to coils 30 and 40 in the manner that will hereinafter be disclosed. In the preferred construction, coil 30 and coil 40 each have an independent connection to control circuit 5, namely respectively denoted lines (mot 2, mot 1). A common connection line, denoted mot 0, is also provided. These three connections, mot 2, mot 1 and mot 0 are all electrically coupled to control circuit 5 in a manner so as to provide to the respective coils 30 and 40, current-pulses consistent with the diagrams of FIGS. 3 and 5. However, it should be understood that coils 30 and 40 could be driven by separate connections as would be understood by one skilled in the art. Additionally, it should be understood that each positive and negative current-pulse value will be assumed to be one (1) unit, as it is the direction, and not the actual magnitude, that is important. FIGS. 2 and 4 show, down the right hand side the voltage values being applied to the respective mot 2, 1, 0 lines by control circuit 5.

That is, for purposes of understanding the present invention, a "logic 1 or logic 0" on line mot 2 and its compliment (i.e. "logic 0 or logic 1") on line mot 0 will create a current $I_{30}$ through coil 30, its direction being discussed in greater detail below. Similarly, a "logic 1 or logic 0" on mot 0 and an opposite "logic 0 or logic 1" on line mot 1 will create a current $I_{40}$ through coil 40, its direction also being discussed in greater detail below. Lastly, the same logic values, whether 0 or 1, on the opposing pair of lines (i.e. mot 2/0 or mot 0/1) will result in no current flowing through the respective coil.

In a preferred embodiment, stepping motor 10 is incorporated into a wristwatch, and preferably, one that contains analog movements, although additional digital functionality can also be provided.

With the foregoing in mind, it should now be understood that when coils 30 and 40 are energized by their respective currents $I_{30}$ and $I_{40}$, they subject rotor 50 to magnetic fields $R_{30}$ and $R_{40}$, respectively, the directions of which arc substantially symmetrical with respect to a diameter of the rotor and mutually inclined at about 60 degrees. The sense (i.e. direction) of the currents $I_{30}$ and $I_{40}$ determine in each case the sense (i.e. direction) of the corresponding fields $R_{30}$ and $R_{40}$.

Figure 2A:
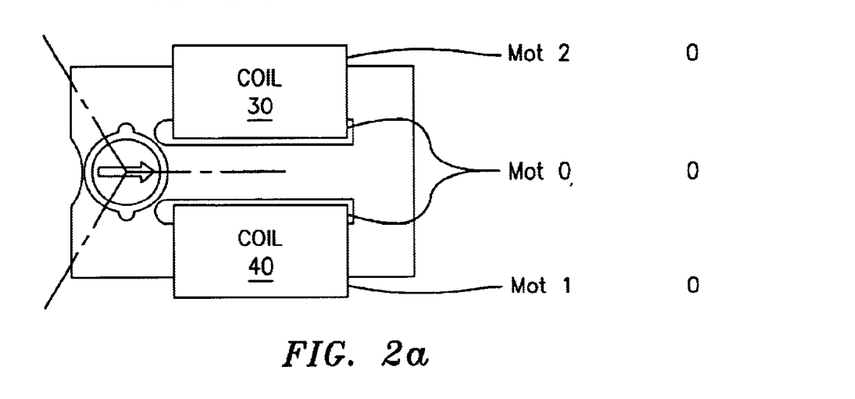
FIGS. 2a–2e are diagrammatic illustrations of the stepping motor of FIG. 1 being respectively illustrated in its various configurations of operation, and specifically, when the rotor is rotating in a clockwise direction.
Figure 2B:
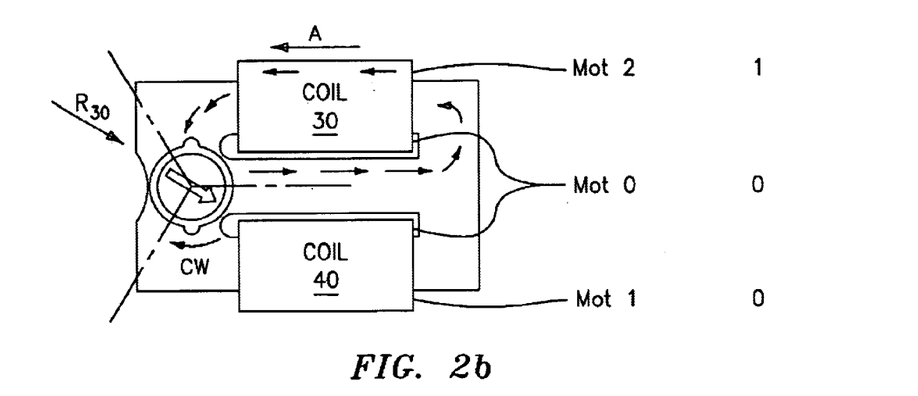
Figure 2C:
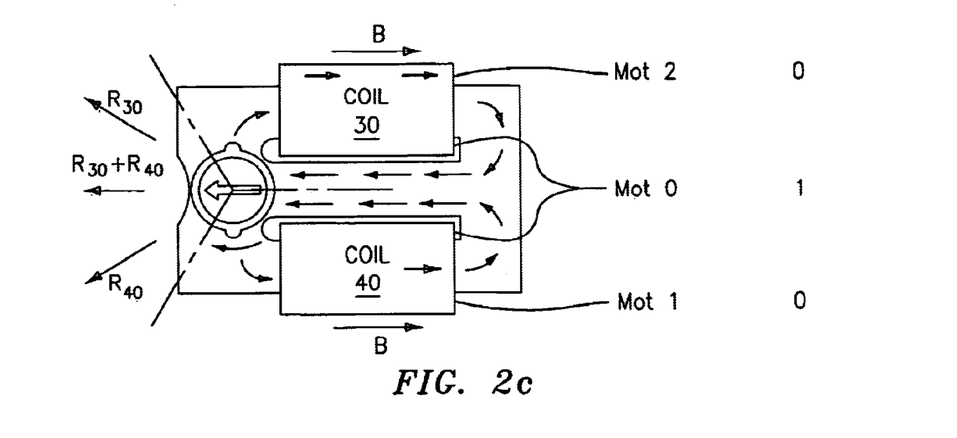
Figure 2D:
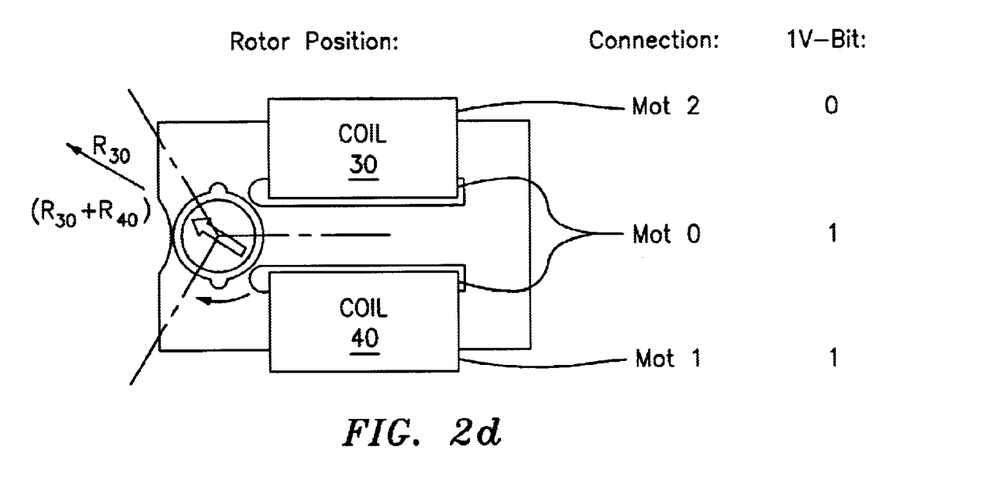
Figure 2E:
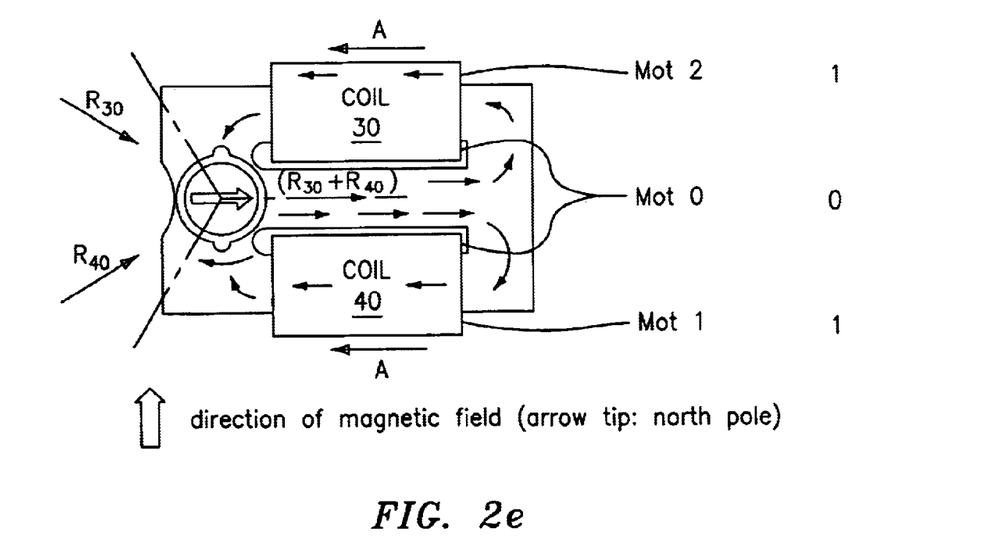
Figure 3:
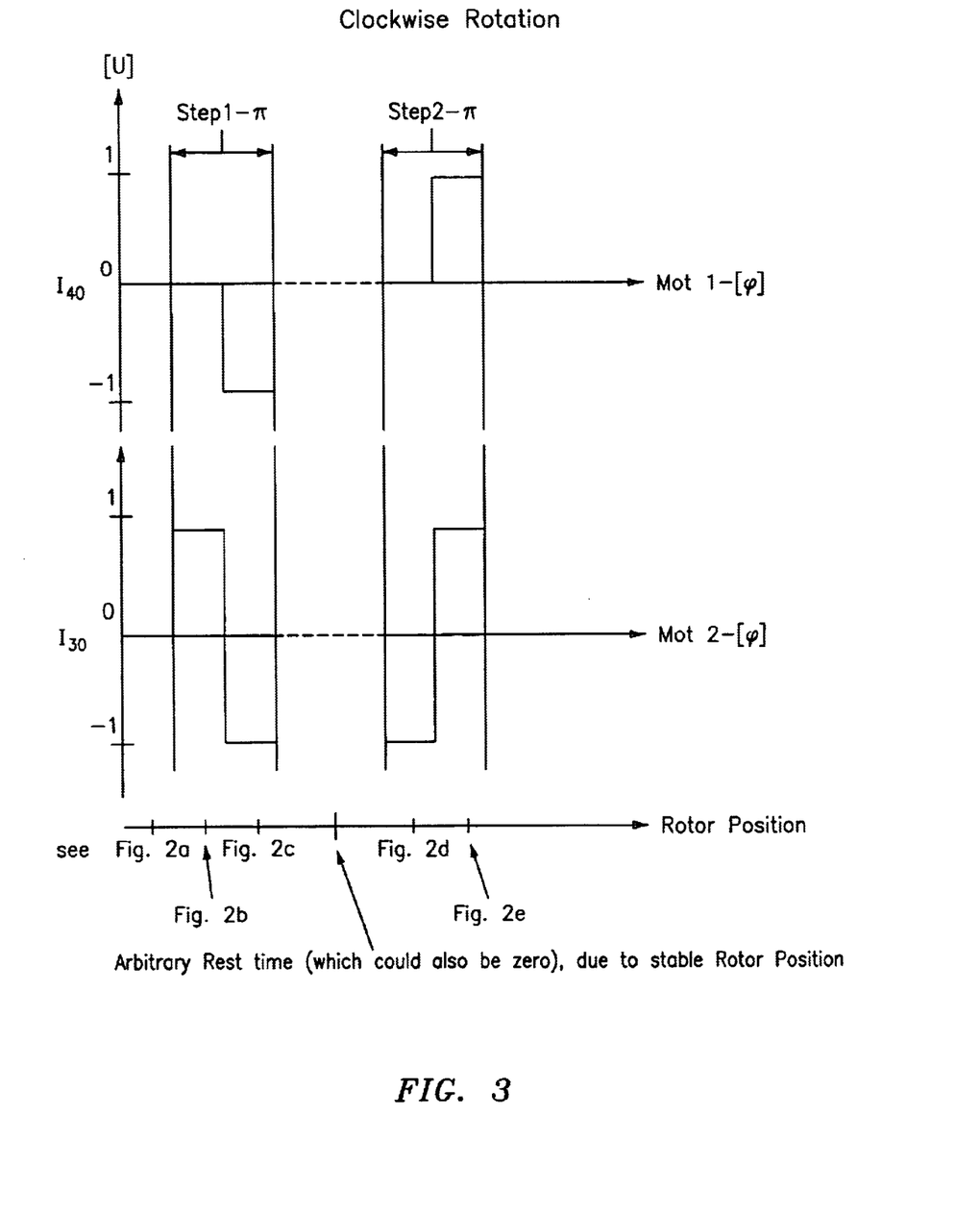
FIG. 3 is diagram illustrating graphically the energizing current-pulses passing through the stator coils of the stepping motor of FIG. 1 as it rotates in the clockwise direction.

With the construction and arrangement of motor 10 as disclosed above, the following conditions can occur for a clockwise rotation of rotor 50, reference being made to FIGS. 2a–2e (for the illustrations of the orientations of rotor 50 as it makes its clockwise steps) and FIG. 3 (for an illustration of the timing/direction of the current-pulse sequences to effectuate the clockwise rotation thereof).

Clockwise Rotation of Rotor 50

FIG. 2a:

At this time, the voltage, applied to connection lines mot 2, mot 1, mot 0 are all equal, and preferably all zero. Hence, there is no current flowing through either coil 30 or coil 40, and thus, there are no external magnetic fields acting upon rotor 50. Therefore, rotor 50 is in its rest position.

FIG. 2b:

Here, coil 30 is energized by a positive voltage differential of one (1) unit between mot 2 and mot 0, while the current through coil 40 remains at zero (i.e. the voltage differential between mot 0 and mot 1 is zero). As can be seen in FIG. 3, current $I_{30}$ has a sense (which will hereinafter be referred to as the "positive" sense) such that, within coil 30, the field is directed in the direction indicated by arrow "A" (FIG. 2b). Within coil 40 the field is zero. Thus, this one current $I_{30}$ creates, outside the coil, field $R_{30}$, the sense of which will be referred to as "positive." Thus, the resultant field $R_{30}+R_{40}$ is, in this instance, equal to $R_{30}$, and at least essentially, if not exactly, in a direction forming an angle of 30 degrees with reference to axis S taken in the CW direction. Because of the magnetization of rotor 50 in the above-disclosed manner, rotor 50 will rotate 30 degrees in the CW direction.

FIG. 2c:

It is at this juncture, as set forth above, that the objective is for rotor 50 to complete its 180-degree step in the clockwise direction. To achieve this, the current through coil 30 is reversed (mot 0 is positive with respect to mot 2) such that current $I_{30}$ is now deemed to have a "negative" sense such that within coil 30, the field is directed in the direction of arrow "B." In this way, current $I_{30}$ now creates, outside the coil, field $R_{30}$, the sense of which is opposite to the "positive" sense (i.e. "negative").

Additionally, coil 40 is also energized (line mot 0 is positive with respect to mot 1) in a manner such that current I40 has a "negative" sense (see FIG. 2c) such that, within coil 40, the field is directed in the direction indicated by arrow "B." Current $I_{40}$ creates, outside the coil 40, a field $R_{40}$, the sense of which will be referred to as "negative," its magnitude (although not direction) being equal to that of field $R_{30}$.

The resultant field $R_{30}+R_{40}$ outside the coils is consequently directed through rotor 50 in a direction substantially parallel to the axis of symmetry S in a line indicated by arrow ($R_{30}+R_{40}$). Thus, the resultant field $R_{30}+R_{40}$ causes rotor 50 to rotate in its clockwise direction the remaining 150 degrees to its final intermediate position as illustrated in FIG. 2c.

FIG. 2d:

Continuing the rotation of rotor 50 in its clockwise rotation, the objective now is to cause rotor 50 to rotate yet another 30 degrees in the CW direction. To achieve this, the flow of current $I_{40}$ through coil 40 is stopped (by providing a zero voltage differential between lines mot 0 and mot 1). Current $I_{30}$ again is of a "negative" sense (i.e. in the direction of arrow "B"), thus again providing, outside coil 30, field $R_{30}$, the sense of which is "negative."

Because field $R_{40}$ is once again zero, the resultant field $R_{30}+R_{40}$ is again equal to the $R_{30}$ component, and at least essentially, if not exactly, in a direction forming an angle of 210 degrees with reference to axis of symmetry S taken in the clockwise direction (see arrow ($R_{30}+R_{40}$)). Because of the resultant magnetic field, rotor 50 will rotate an additional 30 degrees in the CW direction, taken with reference to the axis of symmetry S and its starting position being that illustrated in FIG. 2c.

FIG. 2e:

At this time the final objective is for rotor 50 to complete its second step of 180 degrees in the clockwise direction. Once again, the current through coil 30 is reversed (see FIG. 3 and specific reference to FIG. 2c therein) such that current $I_{30}$ once again has a "positive" sense (i.e. in the direction of arrow "A") and that current $I_{30}$ creates, outside coil 30, field $R_{30}$, the sense of which is again "positive."

Similarly, coil 40 is also energized in a manner such that current $I_{40}$ has been reversed (i.e. now in the "positive" sense) such that within coil 40. the field is directed in the direction of arrow "A" Current $I_{40}$ thus creates, outside coil 40, a field $R_{40}$, the direction of which is in the "positive" sense, its magnitude (although not direction) again being equal to that of field $R_{30}$.

The resultant field $R_{30}+R_{40}$ outside the coils again is consequently directed through rotor 50 in a direction substantially parallel to the axis of symmetry S in a line indicated by arrow ($R_{50}+R_{40}$). Thus, the resultant field ($R_{30}+R_{40}$) cause rotor 50 to rotate in its clockwise direction the remaining 150 degrees to its final (and starting) position illustrated in FIG. 2e.

Counter-Clockwise Rotation of Rotor 50

Figure 4A:
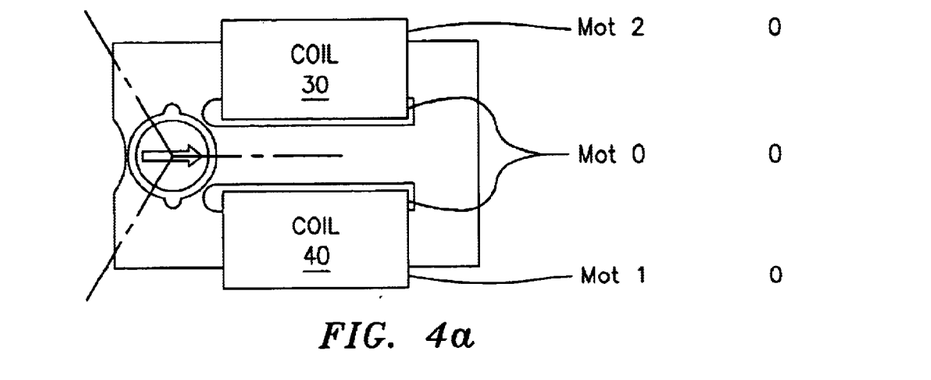
FIGS. 4a–4e are diagrammatic illustrations of the stepping motor of FIG. 1 being respectively illustrated in its various configurations of operation, and specifically, when the rotor is rotating in a counter-clockwise direction.

Reference is now made to FIGS. 4a–4e and FIG. 5, in connection with The following disclosure, for a discussion of the preferred methodology and current-pulse sequences for causing rotor 50 to rotate in the counterclockwise ("CCW") direction from an initial starting position illustrated in FIG. 4a. Similar to FIGS. 2a–2e, the following conditions preferably occur:

FIG. 4a:

At this time, no current flows through either coil 30 or coil 40. For this reason, there are no external magnetic fields acting upon rotor 50, and hence, rotor 50 maintains its rest position.

Figure 4B:
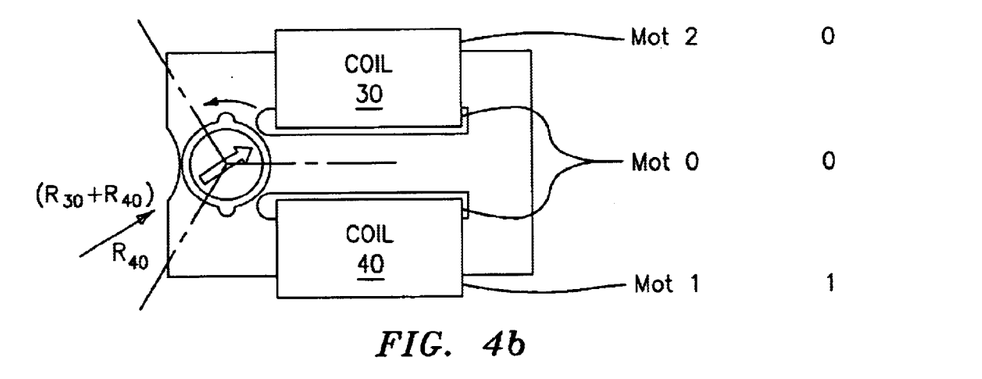

FIG. 4b:

Here, coil 40 is energized by mot 1 being positive with respect to mot 0, while the current trough coil 30 remains zero (i.e. the voltage differential between mot 2 and 0 is zero). Current $I_{40}$ has a positive sense, while within coil 30 the field is zero. Thus, this one current $I_{40}$ creates, outside coil 40, field $R_{40}$, which is "positive." Thus, the resultant magnetic field $R_{40}+R_{30}$ is, in this instance, equal to $R_{40}$, and at least essentially, if not exactly, in a direction forming an angle of 30 degrees with reference to the axis of symmetry S taken in the CCW direction. Because of the magnetization of rotor 50 in the above-disclosed manner, rotor 50 will rotate 30 degrees in the CCW direction.

Figure 4C:
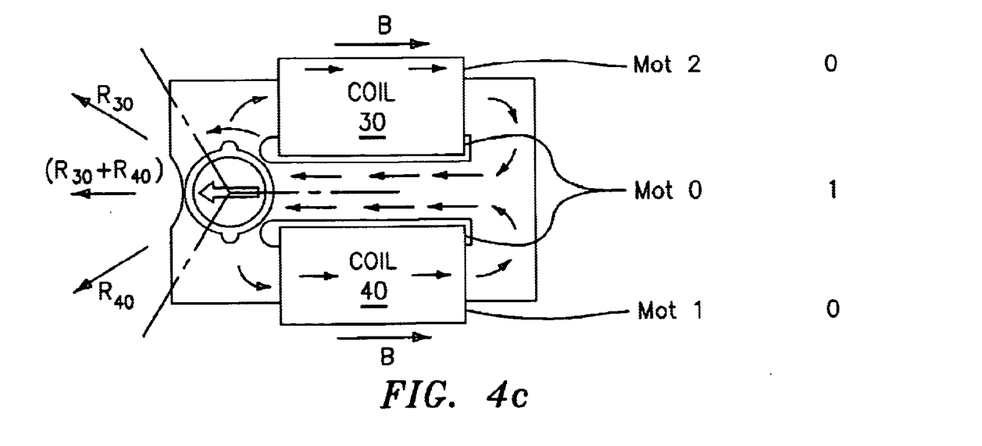

FIG. 4c:

It is at this juncture that rotor 50 completes its first 180 degree step in the CCW direction. To achieve this, the current through coil 40 is reversed such that the field outside coil 40, i.e. field $R_{40}$, is now "negative" (i.e. in the direction of arrow "B").

Additionally, coil 30 is also energized such that outside coil 30, a field $R_{30}$ having a "negative" sense is created (i.e. in the direction of arrow "B"), its magnitude (although not direction) being equal to that of field $R_{40}$.

The resultant field $R_{40}+R_{30}$ outside the coils is consequently directed through rotor 50 in a direction substantially parallel to the axis of symmetry S in a line indicated by arrow $(R_{40}+R_{30})$. Thus, the resultant field $R_{40}+R_{30}$ causes rotor 50 to rotate in its counter-clockwise direction the remaining 150 degrees to its final intermediate position as illustrated in FIG. 4c.

Figure 4D:
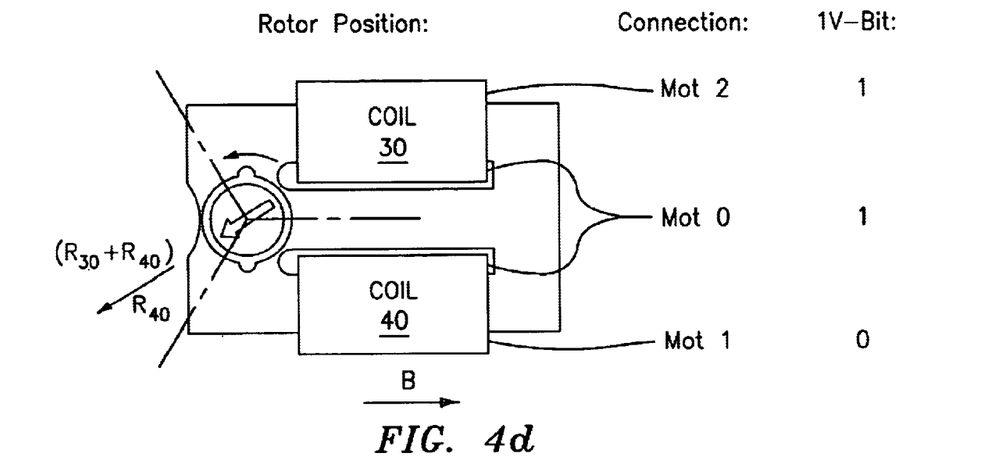

FIG. 4d:

Continuing the rotation of rotor 50 in its CCW direction, the objective now is to cause rotor 50 to rotate yet another 30 degrees. To achieve this, the flow of current $I_{30}$ through coil 30 is stopped (voltage differential between mot 2 and mot 0 is zero). The current $I_{40}$ again is of a "negative" sense (i.e. arrow "B"), thus again providing, outside coil 40, field $R_{40}$, the sense of which is "negative."

Because field $R_{30}$ is once again zero, the resultant field $R_{30}+R_{40}$ is, in this instance, entirely equal to the $R_{40}$ component and in a direction forming an angle of 210 degrees with reference to axis S taken in the CCW direction (see arrow $(R_{40}+R_{30})$). Because of the resultant field, rotor 50 will rotate an additional 30 degrees in the CCW direction (taken with reference to the axis of symmetry S and its starting position being that illustrated in FIG. 4c).

Figure 4E:
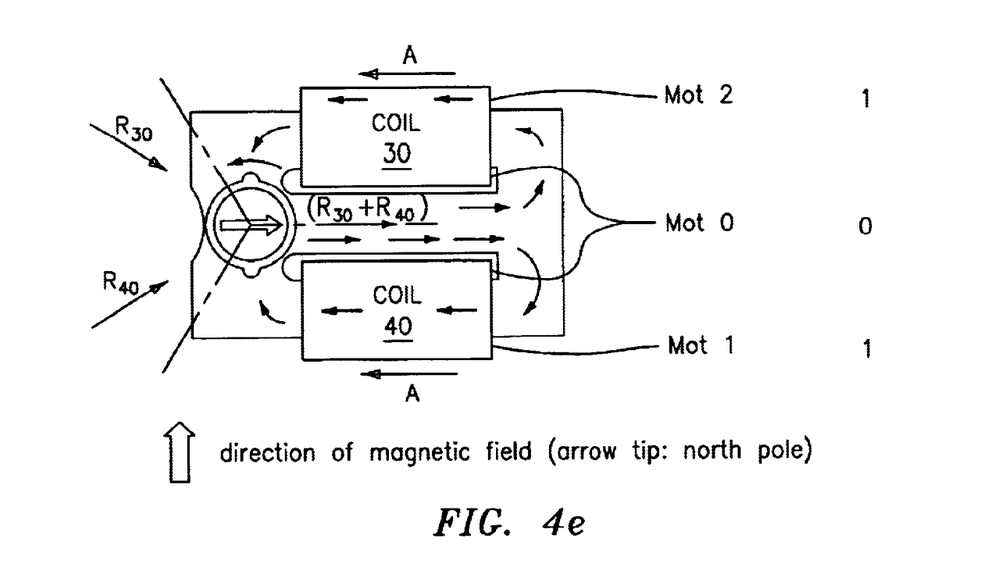

FIG. 4e:

At this time the final objective is for rotor 50 to complete its second step of 180 degrees in the CCW direction. Once again, the current through coil 40 is reversed thus creating outside coil 40, field $R_{40}$, the sense of which is again "positive" (i.e. in the direction of arrow "A").

Similarly, coil 30 is also energized in a manner such that current $I_{30}$ is in the "positive" sense such that, within coil 30, the field is in the direction of arrow "A." Current $I_{30}$ thus creates, outside coil 30, a field $R_{30}$, the direction of which is also in the "positive" sense, its magnitude again being equal to that of field $R_{40}$.

The resultant field $R_{30}+R_{40}$ outside the coils again is consequently directed through rotor 50 in a direction substantially parallel to the axis of symmetry S in a line indicated by arrow $(R_{30}+R_{40})$. Thus, the resultant field $R_{30}+R_{40}$ causes rotor 50 to rotate in its CCW direction the remaining 150 degrees to its final (and starting) position illustrated in FIG. 4e.

Operation of the Present Invention

Consequently, it is seen that one can create, in the region of rotor 50, different resultant magnetic fields depending on the sense of the energizing currents passing through coils 30 and 40. By stopping and/or changing the sense of currents $I_{30}$ and $I_{40}$, the resultant magnetic fields can be rotated in either one direction or the other, in order to effectively and accurately drive rotor 50 in the clockwise or counter-clockwise direction, completing two steps per revolution.

Thus with the foregoing conditions in mind, the operation of the present invention, namely, the stepping of motor 10 in the clockwise direction with two steps per revolution, will now be disclosed.

It will be assumed that rotor 50 is initially oriented as indicated in FIG. 2a, such that its North (N) pole is situated in the vicinity of pole face 25. To rotate rotor 50 in the direction of arrow "CW" (i.e. the clockwise sense) an initial 30 degrees (FIG. 2b), current $I_{30}$ is supplied to coil 30 (by means of a electronic control circuit 5, while the current through coil 40 remains zero. The resulting field $R_{30}+R_{40}$ then acts on the magnet of rotor 50 so that its North pole rotates 30 degrees, in a direction moving closer to pole face 23. The created torque rotates rotor 50 in the CW sense subject to the condition, obviously, that the torque must be greater than the total of the positioning torque and of the frictional torque exerted on rotor 50 by the mechanical elements which motor 10 has to drive. It can therefore be seen that only a current-pulse through only one coil (i.e. coil 30) is needed to cause rotation in the desired direction.

When rotor 50 has rotated through about 30 degrees and occupies approximately the position represented in FIG. 2b, control circuit 5 reverses the sense of the current $I_{30}$ (in the manner disclosed above with respect to voltage differentials between lines mot 2 and mot 0) and also causes a current $I_{40}$ through coil 40, the sense of which is "negative," thereby creating a field $R_{40}$, the magnitude and direction of which is shown in FIG. 2c. The resultant field $R_{30}+R_{40}$, as illustrated in FIG. 2c, creates a fresh torque, resulting in the continued rotation of rotor 50 in the clockwise direction until it occupies the position represented in FIG. 2c, such that its South (S) pole is located in the vicinity of the pole face 25. In this way, rotor 50 has effected a first step of 180 degrees and currents $I_{30}$ and $I_{40}$ can then be interrupted. It can be seen that current-pulses through each coil is needed to rotate the rotor the remaining 150 degrees in the desired direction.

To cause rotor 50 to effect a second step of 180 degrees, control circuit 5 again supplies a current $I_{30}$ in the "negative" sense while the current through coil 40 remains zero. Consequently, the resultant field $R_{30}+R_{40}$ (note only one current-pulse is needed) has the direction illustrated in FIG. 2d and thus creates, with the magnet of rotor 50, a torque which again drives this rotor in the CW direction an additional 30 degrees (210 degrees in the clockwise direction taken from its initial starting point of FIG. 2a).

Once rotor 50 has rotated the foregoing 30 degrees, control circuit 5 reverses the direction of current $I_{30}$ and provides a current $I_{40}$ through coil 40 in the "positive" sense so that current-pulses are provided on each coil. The resulting field $R_{30}+R_{40}$ is in the direction of FIG. 2e. Consequently, rotor 50 continues to rotate in the CW direction and ends its second step of 180 degrees back in its initial starting position. Control circuit 5 then again interrupts the currents $I_{30}$ and $I_{40}$. The successive pulse-current timing diagram for the CW rotation of rotor 50 is illustrated in FIG. 3.

In order to cause rotor 50 to rotate in the CCW direction, first, to effect a 30 degree step in the counter-clockwise direction, the field $R_{30}+R_{40}$ takes the sense it has in FIG. 4b such that rotor is in the position illustrated in FIG. 4b. Control circuit 5 then reverses the sense of the current $I_{40}$ and also causes a current $I_{30}$ (in the "negative" sense) through coil 30. The sense of $I_{30}$ creates a field $R_{30}$, the magnitude and direction of which are shown in FIG. 4c. The resultant magnetic field $R_{30}+R_{40}$, as illustrated in FIG. 4c, creates a torque about rotor 50 thus continuing its CCW rotation until it occupies the position represented in FIG. 4c, such that its South (S) pole is located in the vicinity of the pole face 25. In this way, rotor 50 has effected its first step of 180 degrees in the CCW direction. Currents $I_{30}$ and $I_{40}$ can then be interrupted if desired.

Figure 5:
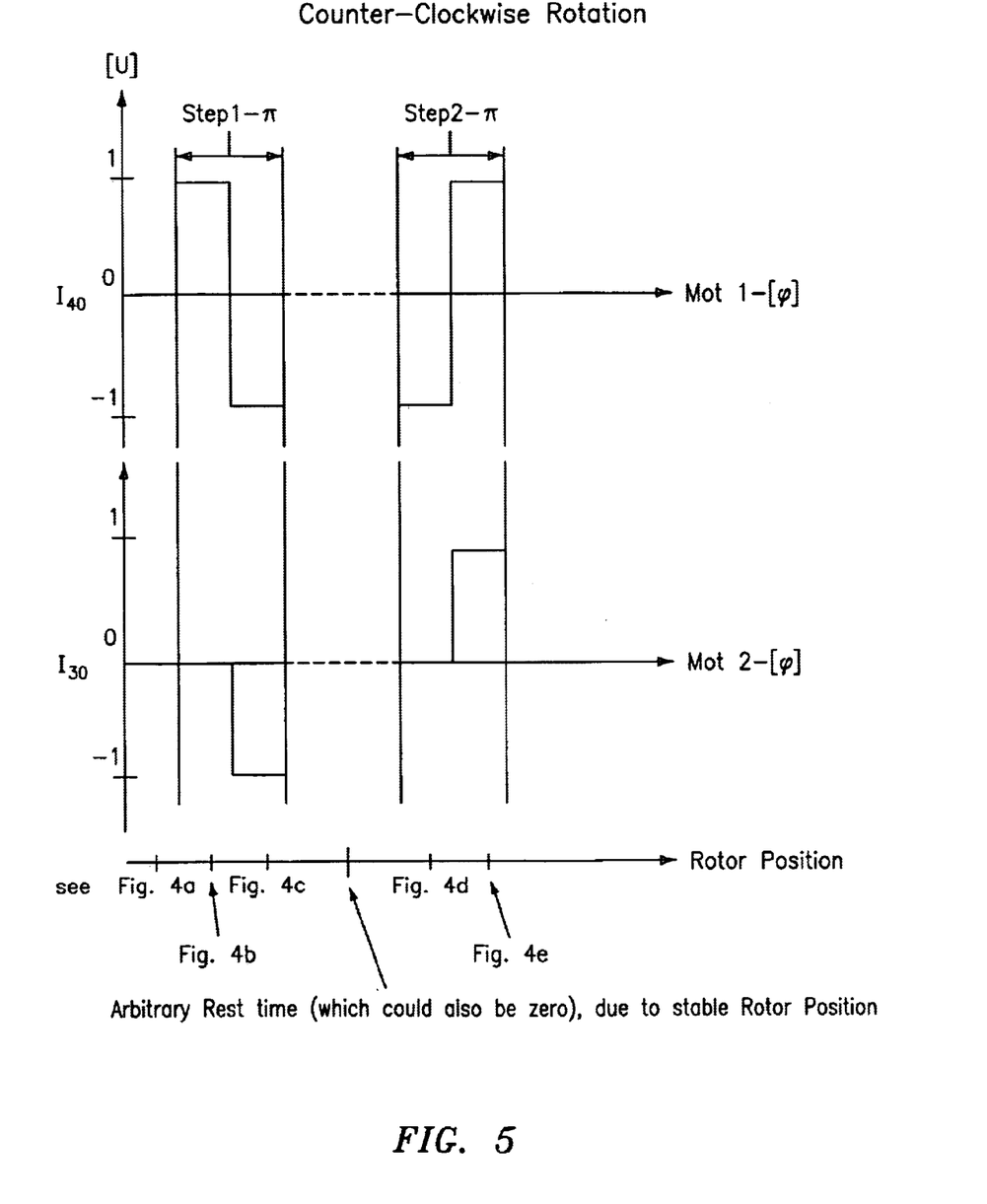
FIG. 5 is diagram illustrating graphically the energizing current-pulses passing through the stator coils of the stepping motor of FIG. 1 as it rotates in the counter-clockwise direction.

Effecting rotor 50 to make its second step of 180 degrees in the CCW direction, control circuit 5 again supplies a current $I_{40}$ in the "negative" sense while the current through coil 30 remains zero. The resultant field $R_{30}+R_{40}$ has the direction illustrated in FIG. 4d and thus creates, with the magnet of rotor 50, a torque which again drives this rotor in the CCW direction an additional 30 degrees. Control circuit 5 then again reverses the current $I_{40}$ and provides a current $I_{30}$ through coil 30 in the "positive" sense. The resulting field $R_{30}+R_{40}$ is in the direction of FIG. 4e. Consequently, rotor 50 continues to rotate in the CCW direction and ends its second step of 180 degrees back in its initial starting position. The control circuit may then again interrupt the currents $I_{30}$ and $I_{40}$. As with the clockwise rotation of rotor 50, the successive pulse-current timing diagram for the foregoing CCW rotation of rotor 50 is illustrated in FIG. 5.

The present invention has the important advantage of always having rotor 50 rotate in the desired direction. That is, regardless of the starting position of rotor 50, the first excitation of the respective coil as disclosed above (FIG. 2b or FIG. 4b) causes rotor 50 to rotate to one of the aforementioned 30 degree angle positions. That is, in the event that rotor 50 is in a position opposite or different from that of the "expected" or "desired" position, once control circuit 5 sends the proper current ($I_{40}$ or $I_{30}$) in the "correct" sense, rotor 50 will make a rotation of at most 150 degrees in the opposite direction, at which time it will be in the correct position to make its next 150 degree rotation (i.e. in precisely the position it must be at this moment of the cycle). From this point on, rotor 50 rotates in the desired direction. It can easily be seen that rotor 50 resumes, in all cases, the desired sense of rotation in a similar way, whatever this sense of rotation may be and whatever may be the moment of the cycle at which occurs the incident which brings this rotor again into an erroneous position.

It can thus be seen that a stepping motor constructed in accordance with the present invention provides significant and desirable advantages over those found in the prior art. For example, it can now be seen that the present invention provides for a rotor that can rotate, from its rest position, with merely a pulse from one coil. Once a small rotation (i.e. 30 degrees) has been reached, the remaining rotation (i.e. 150 degrees) is achieved through a simultaneous pulse applied by both coils so as to push the rotor to the opposite rest position, thereby completing a first step. The direction of rotation of the rotor is easily reversed if the current-pulse scheme is reversed. A stepping motor of the type disclosed herein overcomes the foregoing perceived deficiencies in the prior art, while also being able to smoothly run in both the forward and reverse direction, maintain a low power consumption, and merely needs to rely on the pulse-current scheme for its directional rotation.

Furthermore, it should be well appreciated that the present invention is well-suited for a wide variety of devices, such as timepieces that utilize analog movements. Examples of such timepieces are described in U.S. Pat. Nos. 4,744,066; 4,888,749; 5,059,840; 4,888,507; and 4,886,988, the disclosures all of which are incorporated by reference as if fully set forth herein. Accordingly, a timepiece that would include one or more of the stepping motors disclosed in the instant application is well within the contemplated uses of the present invention. Moreover, such a timepiece is well enabled by the disclosure set forth herein and those patents incorporated herein by reference.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

I claim:

1. A bi-directional stepping motor in which a rotor is rotatable by two steps of 180 degrees each, the stepping motor comprising:

a rotor comprising a permanent magnet and rotatably mounted about an axis and providing a permanent magnetic field;

a first electrical coil and a second electrical coil;

a stator comprising:
three pole faces arranged around the rotor,
a first arm on which the first electrical coil is mounted; and
a second arm on which the second electrical coil is mounted;

a control circuit, coupled to the first and second electrical coils, for applying electrical pulses independently to each coil and for controlling the polarity thereof, the coils producing magnetic fields in response to the pulses and wherein the rotor is rotatable in response to the magnetic fields;

wherein each step of 180 degrees is effectuated by a rotation of the rotor a first X degrees and then by a further rotation of the rotor the remaining 180-X degrees, wherein X is a at least essentially 30 degrees;

wherein the rotation of the rotor the approximately X degrees is achieved by providing to the first coil, a first pulse of a first polarity; and wherein the rotation of the rotor the approximately 180-X degrees to complete a step in achieved by providing to the first coil a second pulse of a second polarity simultaneously with the providing of a pulse of the second polarity to the second coil.

2. The bi-directional stepping motor as claimed in claim 1, wherein the second step of 180 degrees is effectuated by the additional rotation of the rotor X degrees and then by a further rotation of the rotor the remaining 180-X degrees;

wherein the additional rotation of the rotor X degrees is achieved by providing to the first coil, a third pulse of the second polarity; and wherein the rotation of the rotor the approximately 180-X degrees to complete the second step is achieved by providing to the first coil a fourth pulse of the first polarity simultaneously with the providing of a pulse of the first polarity to the second coil;

whereby during the providing of the third pulse to the first coil, there is no pulse being provided to the second coil.

3. The stepping motor as claimed in claim 1, wherein the stepping motor is incorporated into a wristwatch.

4. A timepiece comprising at least one stepping motor as claimed in claim 1.

5. A bi-directional stepping motor in which a rotor rotates in steps of 180 degrees, the stepping motor comprising:

a rotor comprising a permanent magnet and rotatably mounted about an axis and providing a permanent magnetic field;

a first electrical coil and a second electrical coil;

a stator comprising:
three pole faces arranged around the rotor,
a first arm on which the first electrical coil is mounted; and
a second arm on which the second electrical coil is mounted;

a control circuit, coupled to the first and second electrical coils, for applying electrical pulses independently to each coil and for controlling the polarity thereof, the coils producing magnetic fields in response to the pulses and wherein the rotor is rotatable in response to the magnetic fields;

wherein each step of 180 degrees is effectuated by a rotation of the rotor a first X degrees and then by a further rotation of the rotor the remaining 180-X degrees, wherein X is a at least essentially 30 degrees;

wherein a first pulse of a first polarity to the first coil creates a magnetic field sufficient to rotate the rotor approximately X degrees; and wherein a second pulse of a second polarity to the first coil simultaneously with a pulse of the second polarity to the second coil creates a resultant magnetic field sufficient to rotate the rotor the approximately 180-X degrees to complete a step.

6. A timepiece comprising at least one stepping motor as claimed in claim 5.

7. A method of rotating a rotor in a bi-directional stepping motor comprising a first electrical coil and a second electrical coil, a stator comprising three pole faces arranged around the rotor, a first arm on which the first electrical coil is mounted and a second arm on which the second electrical coil is mounted, and a control circuit, coupled to the first and second electrical coils, for applying electrical pulses independently to each coil the method comprising the steps of:

applying electrical pulses independently to the first and second coils and controlling the polarity thereof, the coils producing magnetic fields in response to the pulses and wherein the rotor is rotatable in response to the magnetic fields;

rotating the rotor a first X degrees and then rotating the rotor an additional 180-X degrees, wherein X is at least essentially 30 degrees wherein the rotation of the rotor the approximately X degrees is achieved by providing to the first coil, a first pulse of a first polarity; and providing to the first coil a second pulse of a second polarity simultaneously with the providing of a pulse of the second polarity to the second coil for causing the rotation of the rotor the approximately 180-X degrees to complete a step.

8. The method as claimed in claim 7, including the steps of:

providing to the first coil, a third pulse of the second polarity for causing the rotor to rotate another X degrees; and providing to the first coil a fourth pulse of the first polarity simultaneously with the providing of a pulse of the first polarity to the second coil for causing the rotation of the rotor the approximately 180-X degrees to complete the second step;

whereby during the providing of the third pulse to the fist coil, there is no pulse being provided to the second coil.

* * * * *